United States Patent [19]
Reipur et al.

[11] Patent Number: 5,690,823
[45] Date of Patent: Nov. 25, 1997

[54] FILTRATION MEDIUM

[76] Inventors: John Reipur, Fabritius Allé 17; Hans Olsen, Christiansholmsvej 32, both of DK-2930 Klampenborg, Denmark

[21] Appl. No.: 433,390
[22] PCT Filed: Sep. 9, 1993
[86] PCT No.: PCT/DK93/00366
   § 371 Date: May 8, 1995
   § 102(e) Date: May 8, 1995
[87] PCT Pub. No.: WO94/11088
   PCT Pub. Date: May 26, 1994

[30] Foreign Application Priority Data

Nov. 9, 1992 [DK] Denmark ................ 1361/92

[51] Int. Cl.[6] ..................................... B01D 63/00
[52] U.S. Cl. ..................... 210/321.8; 210/321.79; 210/500.1; 210/505; 55/527; 55/528; 264/DIG. 48
[58] Field of Search .......... 210/321.88, 321.79, 210/321.8, 321.81, 321.9, 321.89, 500.23, 500.36, 500.26, 500.27, 503, 500.1, 505, 508, 509; 55/527, 528; 264/DIG. 48

[56] References Cited

U.S. PATENT DOCUMENTS

| | | | |
|---|---|---|---|
| 3,019,186 | 1/1962 | Powers | 210/506 |
| 3,748,828 | 7/1973 | LeFebvre | 55/527 |
| 3,853,687 | 12/1974 | Ishikawa et al. | 161/162 |
| 3,886,955 | 6/1975 | Johnson et al. | 210/433 |
| 4,201,673 | 5/1980 | Kanno et al. | 210/321.81 |
| 4,219,420 | 8/1980 | Müller | 210/527 |
| 4,689,255 | 8/1987 | Smoot et al. | 210/500.26 |
| 4,917,797 | 4/1990 | Imacio et al. | 210/321.8 |
| 4,961,464 | 10/1990 | Wullbeck et al. | 210/321.9 |
| 4,990,252 | 2/1991 | Tomaschke et al. | 210/500.23 |
| 5,190,571 | 3/1993 | Fay et al. | 55/527 |
| 5,211,728 | 5/1993 | Trimmer | 210/321.8 |
| 5,409,514 | 4/1995 | Ragusa et al. | 55/DIG. 17 |

FOREIGN PATENT DOCUMENTS

| | | |
|---|---|---|
| 0 119 340 A1 | 9/1984 | European Pat. Off. |
| B 454240 | 4/1988 | Sweden |

*Primary Examiner*—Ana Fortuna
*Attorney, Agent, or Firm*—McAulay Fisher Nissen Goldberg & Kiel, LLP

[57] ABSTRACT

A filtration medium made from a plurality of solid fibers aligned in the same direction and packed and bundle together and compressed at a portion thereof by a retainer member, and a displacement member disposed inside the packed fibers forming close packed aligned fibers defining a fluid flow passages between the fibers having a cross-sectional area capable of retaining particles from a fluid passing therethrough.

28 Claims, 10 Drawing Sheets

FILTRATION MEDIUM

The present invention relates to a filtration medium for use in filtering a fluid, and a method for making a filtration medium.

Filtration is one of the most widely used separation techniques. The process of filtration can be subdivided in a number of ways, for instance according to the filtration mechanism or the size of the particles which are to be separated, i.e. filtered, from the fluid. In the case of filtration for the separation of particles of size in the microscopic range, the following terms are widely used to specify the size of the particles which are to be separated: Macrofiltration (retention of particles having a size of at least 5 μm), microfiltration (retention of particles having a size in the range of 0.05 μm–5 μm) and ultrafiltration (retention of particles having a size below approximately 0.05 μm). Most bacteria fall within the microfiltration range, whereas viruses clearly fall within the ultrafiltration range.

At present, one of the most widely used types of filter for filtration in the microfiltration and ultrafiltration ranges is a filter membrane. Such membranes are relatively thin (approximately 150 μm) and have a well-defined and stable pore structure. Despite the great advantages of membrane filters, it is highly disadvantageous that the flow rate (and, thus, the filtration capacity) through the filter must normally be kept low due to the low mechanical strength of such membranes. Furthermore, membrane filters are very expensive.

Today, there is much focus on the quality of water for use domestically as well as for industrial purposes, partly due to the increasing pollution of the environment in general and partly due to increasing public awareness with regard to the quality of food and beverages, which in turn results from the enormous interest in physical well-being, fitness and health which is shown by a large proportion of the population in industrialised and urbanised countries throughout the world. In turn, this has led to an increasing demand for means for providing, for instance, household tap water of satisfactory quality. A variety of filtration means are marketed for this purpose, charcoal type filters being among the most widely used types. However, the known filtration means all have the disadvantages that they are rather expensive, rather voluminous and, most important, they are often incapable of discharging the particles filtered from the fluid. Accordingly, the filtration means must be renewed rather frequently in order to maintain the quality of the filtered water, since the accumulation of microbiological material in the filter in the long run will eventually turn the filter into a site of harmful microbiological growth.

Thus, there is a pressing need for a filtration medium which is simple and inexpensive, so that the filtration medium can be renewed as frequently as necessary, and which at the same time is of considerable mechanical strength so as to permit high flow rates. Furthermore, it would be even more advantageous if the filtration medium could be regenerated in situ from time to time in order to prevent clogging and minimize microbiological growth therein.

Therefore, it is an object of the present invention to provide a filtration medium which is capable of removing by filtration particles of a given size from a fluid flowing through the filtration medium without causing an unacceptably large pressure drop and which at the same time is relatively inexpensive and simple to manufacture.

It is essential that the fluid-flow passages in the filtration medium can be dimensioned sufficiently accurately so that the resulting filtration medium is capable of retaining particles of a predetermined size, i.e. that a filtration medium of a well-defined specification can be produced.

It has now been found surprisingly that a simple and novel type of filtration medium can fulfil the above-mentioned requirements.

The present invention relates to a filtration medium for use in filtering a fluid, the filtration medium comprising a plurality of fibers extending in substantially the same general direction and being close packed at a location so as to define fluid-flow passages therebetween, each of the fluid-flow passages having at said location a cross-sectional area which is sufficiently small to retain particles to be filtered from the fluid.

Another object of the invention is to provide a method for making a filtration medium for use in filtering a fluid.

The fluid to be filtered may be a gaseous fluid of any type, such as combustion gas, air, or gases for medical or industrial use. However, the invention particularly relates to a filtration medium for use in filtering a liquid fluid, such as liquid solvents, cleaning fluids, and fluids used in industrial processes. More particularly, the invention relates to a filtration medium for use in filtering water or aqueous fluids, such as tap water, sea water, lake water or waste water.

In contrast to the known types of filters and filtration media used for filtering fluids such as those mentioned above, the filtration medium of the present invention can be provided as a very compact filter, i.e. it occupies only a small volume. Furthermore, the fibers which make up the filtration medium can be selected so as to confer to the resulting filter or filtration medium desired properties with respect to, for example, filter size (pore size), mechanical strength, resistance to chemical substances, resistance to fungi and pressure drop.

Also, in contrast to, for example, reverse osmosis membrane filtration, in which a large pressure must be applied and, accordingly, a large pressure drop across the membrane or membranes (several layers of membranes may be applied) is observed, the filtration medium of the invention is operable at relatively low pressures but is nevertheless capable of withstanding large pressures without being damaged or destroyed.

Furthermore, for many purposes such as filtration of water to be used in medical or industrial processes or for household purposes, the filtration medium of the invention can be manufactured from commercially available, inexpensive fiber materials having the necessary properties to provide purified water or substantially pure water, depending on the desired quality of the filtered liquid.

The filter of the present invention is also very suitable for use as the filtration medium of the apparatus of the type disclosed in Danish patent application No. 700/90, International Publication No. WO/91/13673.

DESCRIPTION OF THE PREFERRED EMBODIMENTS

Figure 1:
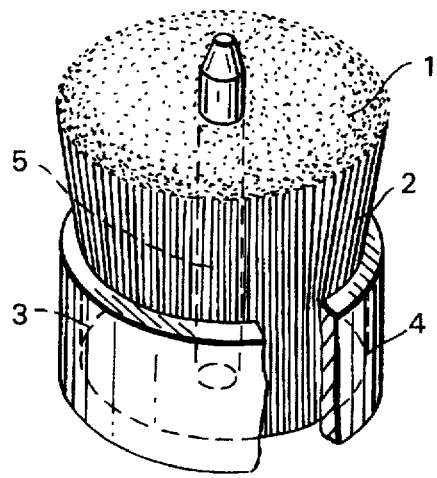
FIG. 1 shows in perspective an embodiment of the invention, a plurality of fibers extending in substantially the same general direction being arranged in an opening of a retaining member and having a displacement member inserted therein.

By the term "extending in substantially the same general direction" is meant that the fibers which make up the filtration medium are arranged either so as to be substantially parallel to each other for at least part of their length or that the fibers are assembled in a bundle so as to have a macroscopic structure which resembles for example a painting brush or a bundle or package of unboiled macaroni.

The term "close packed" or the term "close packing" refers to a situation wherein each of the fibers are adjacent to, i.e. the surface of the fiber is touching, at least one other fiber present in a bundle of fibers. The touching is partly dependent on the cross-sectional shape of each fiber, that is, the geometry.

By the term "location" is meant a certain (predetermined) point in the longitudinal direction of the fiber or a certain (predetermined) length of the fiber, i.e. a predetermined part of the fiber. Accordingly, the filtration medium of the invention comprises fibers which are close packed in part of their longitudinal direction or at least close packed at one point of their longitudinal direction. At the location of close packing of the fibers, the close packing is preferably achieved by compressing the fiber bundle so that each fiber at the location is adjacent to one or more other fibers. Accordingly, the interstices thus formed between the fibers of the filtration medium at the location of close packing are the fluid-flow passages of the filtration medium having the smallest cross-sectional area, thus defining the size of the particles which can be filtered from the fluid flowing through the filtration medium. The location of close packing of the fibers is preferably not at the end of the fiber(s), i.e. the fibers preferably extend in the longitudinal direction on both sides of the location of chose packing.

Those parts of the fibers of the filtration medium which are not close packed at a location are preferably capable of undergoing some minor movements when a fluid is flowing through the filtration medium. This minor movement of the fibers has several advantages. Firstly, the interstices between the fibers may be of varying cross-sectional area due to the movement, this area mostly being substantially larger than the cross-sectional area of the interstices at the location of close packing. As a result, particles substantially larger than the interstices at the location of close packing will be retained in the filtration medium before or even well before the location of close packing. Secondly, the relatively large freedom of movement of the fibers has the effect that particles retained in this part of the filtration medium will not easily clog the filtration medium, since the particles retained may move around due to the movements of the fibers. The movement of the fibers can be considered as being a kind of ciliary movement, the above-mentioned effect being similar to that of cilia, e.g. in nasal passages.

The cross-sectional area and the shape of the fluid-flow passages at the location of close packing, i.e. of the interstices between the fibers, is determined partly by the cross-sectional shape and area of the fibers which are close packed and partly by the tightness of the close packing.

The cross-sectional shape of the fibers making up the filtration medium may be any suitable shape. However, it is generally preferable that the cross-sectional shape is regular so that the interstices formed by the close packing of the fibers may have the same (a uniform) cross-sectional shape. Accordingly, the cross-sectional shape of the fibers can be any regular geometrical shape which will leave interstices between the fibers when they are close packed. A circular cross-sectional shape of the fibers is preferred. Other preferred cross-sectional shapes are those of polygons, more preferably polygons having at least 5 sides, e.g. a pentagon, hexagon, heptagon, etc. The fibers of the filtration medium can be of the same cross-sectional shape or of various cross-sectional shapes, the fibers of various cross-sections being mixed among each other in the bundle of fibers making up the filtration medium.

In a preferred embodiment of the invention, the filtration medium comprises fibers, each fiber being of substantially circular cross-section when the fibers are not close packed and being of the same dimensions. The closest possible packing of such fibers is the so-called hexagonally close packing (HCP) in which each fiber is surrounded by 6 fibers, leaving 6 interstices adjacent to each fiber, all the interstices substantially being of the same (uniform) cross-sectional shape and area.

Each interstice in a hexagonally close packed structure has an area of $(\sqrt{3}-\pi/2) \times r^2$, wherein r is the radius of the circular cross-section. Accordingly, the ratio of the cross-sectional area of the interstices to that of the fibers is $(\sqrt{3}-\pi/2)/\pi \approx 0.0511$. In other words, in a filtration medium according to the invention wherein the fibers are hexagonally close packed, the cross-sectional area of the fluid-flow passages amounts to approximately 5 percent of the total cross-sectional area of the filtration medium.

If the fibers are made of a material which is slightly deformable when a moderate pressure is applied, the hexagonally close packed fibers of circular cross-section will be deformed away from the circular cross-section when a suitable external pressure is applied (for instance by squeezing a bundle of fibers together by hand). Each fiber may eventually acquire a hexagonal shape, i.e. when the fibers are ultimately deformed so as to form a medium without any interstices between the fibers. In the case of a slightly deformable fiber material of circular cross-section, it is therefore contemplated that it is possible to obtain a filtration medium having fluid-flow passages in the form of interstices between the fibers of the filtration medium, the interstices being of any obtainable geometrical shape and having a cross-sectional area corresponding to that of the interstices present in the case of hexagonally close packing as one of the extremes, and a cross-sectional area asymptotically approaching zero as the other extreme.

In embodiments of the invention wherein the fibers of the filtration medium are of the same cross-sectional shape and area, the fluid-flow passages, i.e. the interstices, at the location of close packing are ideally of the same cross-sectional shape and area (cf. the above discussion in connection with hexagonally close packing). However, in practical embodiments of the invention, the fluid-flow passages at the location of closest packing may be of varying cross-sectional shapes and/or areas. For some filtration purposes such a variation is acceptable, whereas a very uniform shape and area of the fluid-flow passages present in the filtration medium may be essential for certain other filtration purposes.

The individual fibers of the filtration medium may be substantially soled, hollow or porous. It is preferred that the fibers are substantially solid, especially when the filtration medium of the invention is used for filtering water so as to obtain purified water or substantially pure water. The above discussion of the cross-sectional shape and area of the fibers applies to any type of fiber irrespective of whether it is substantially solid, hollow or porous.

It is preferred that the outer surface of the fibers is smooth. One advantage of using smooth surfaced fibers is that the cross-section of the fiber may have a regular geometrical shape; another advantage is that it may be more difficult for the particles which are to be filtered from the fluid to adhere to the fiber surface(s), which in turn will generally make it easier to eliminate the retained particles from the filtration medium in a filter-cleaning process, e.g. in a back-flushing process.

Furthermore, it is contemplated that substantially solid fibers having a relatively smooth surface are preferable as the fibers of the filtration medium of the invention when the filtration medium is to be used for filtering undesired particles such as bacteria, fungal spores, insoluble calcium-containing compounds, viruses and insoluble iron-containing compounds, for example ochre, from water which is to be used either industrially or domestically.

Beside the cross-sectional shape and area of the fibers making up the filtration medium of the invention as well as the pressure applied to the bundle of fibers at the location of close packing, all of which are parameters upon which the cross-sectional area and shape of the fluid-flow passages of the resulting filtration medium are dependent, the properties of the filtration medium are solely dependent on the properties of the fibers of the filtration medium, i.e. the properties of the fiber material.

The desired properties of the filter material are determined largely by the fluid which is to be filtered through the resulting filtration medium. The most important properties to take into consideration are physical properties, chemical properties, effect of moisture (i.e. water absorption), effect of temperature, and resistance to fungi, etc.

An important physical parameter is the tensile modulus (stiffness). For most filtration purposes, a suitable material is one having a tensile modulus such that that part of the fibers which is not close packed is capable of performing minor movements when a fluid flows through the filtration medium. When selecting a fiber material having an appropriate tensile modulus, the effect of moisture on the modulus should also be taken into consideration. When the fluid to be filtered is a liquid, the fiber material should be chosen on the basis of its inherent properties when in contact with the liquid in question.

Other physical parameters to be considered when choosing an appropriate fiber material are tensile strength, elongation, bend recovery, melting point, fatigue resistance, water absorption, and specific gravity (density).

Preferably, the resulting filtration medium should be dimensioned on the basis of the inherent properties of the fiber material, or fiber materials in the case of a mixture of various fibers, when the fibers of the filtration medium are soaked in the fluid which is to be filtered. If the filtration medium is designed on the above basis, it should be capable of performing the desired filtration at any time.

It is preferred that the fiber material is not affected by components of the fluid to be filtered. In case of filtration of a fluid, it is of course a prerequisite that the fiber material is resistant to the particular gaseous or liquid component as well as to the particles which are to be filtered from the fluid. However, when choosing the fiber material, the cost of the fiber material and the possibility of making an easily replaceable filtration medium of low cost should be taken into consideration. If the latter is possible, a fiber material of low costs may be preferable or useful even if it is to some extent (which does not substantially reduce the quality of the filtration) in fact affected by the fluid and the particles to be filtered.

If the filtration medium of the invention is to be used for filtering water for industrial or domestic purposes, it is important that the filtration medium, i.e. the fiber material, is resistant, e.g. to attack by rodents, insects, bacteria, and fungi, not strongly affected by chlorine, chloro-compounds, such as chlorinated solvents, and relatively resistant to attack by acidic and basic compounds and/or fluids. In this respect, a fiber material approved by the United States Federal Drug Administration (FDA) is preferred.

Furthermore, it is preferred that the filtration medium is substantially resistant to UV-light. Also, the filtration medium should not be permanently affected by continuous exposure to the temperature of the fluid to be filtered. Thus, the fibers of the filtration medium of the invention must be chosen so as to be capable of withstanding the appropriate temperatures in the case of filtration of warm or hot fluids. It is preferred to use fiber materials which are relatively resistant to deformation in the longitudinal direction. The cross-sectional deformation of the fibers should preferably be slight when a moderate pressure is applied to the fiber from the outside, thus allowing a slight deformation away form the original cross-section when a certain pressure is applied. However, for some filtration purposes, it may be desirable to use fiber materials which are substantially resistant to deformation in all directions.

The fibers of the filtration medium should preferably be relatively thin fibers. Accordingly, each fiber should have a ratio of length to maximum cross-sectional dimension of at least 10, preferably at least 100, more preferably at least 1,000, especially at least 10,000.

As mentioned above, the cross-sectional dimension and shape of the fibers should be chosen on the basis of a knowledge of the fluid to be filtered and the particles to be retained. For the filtration of water, it may prove useful to use fibers of a substantially circular cross-section and having a diameter of at most 5 mm, preferably at most 2 mm, more preferably in the range of 0.001–1–6 mm, especially in the range of 0.01–0.5 mm. The ranges mentioned are of course also applicable in the case of filtration of fluids other than water.

It is contemplated that the fiber material can be any material selected from the group consisting of metals, ceramic materials and natural and synthetic polymers, and which possesses the desired material characteristics with regard, for example to the above-mentioned physical and chemical properties and possibly other inherent properties.

It is believed that glass is a useful ceramic fiber material. In case of natural or synthetic polymer fiber materials, examples of such materials are polyamides, polyesters, polyethylene, polypropylene, polycaprolactam, natural, synthetic and cured rubbers, and silicones (siloxane polymers). However, it is contemplated that other types of polymers may prove useful as fiber materials for certain filtration purposes. Other types of fibers which may be useful are hair fiber of human or animal origin and fibers of natural silk, as well as fibers made of keratin.

Commercial examples of useful synthetic polymer fiber materials which at the same time are of low cost are certain polyamides, e.g. various types of nylon such as nylon 6 and nylon 6/6 (available for example from Pedex+Co. GmbH, Wald-Michelbach, West Germany); nylon filaments of the Tynex® (nylon 6/12) and Herox® types (available from DuPont de Nemours & Co., Delaware, USA); and conventional polyester fiber and polypropylene fiber (available for example from Pedex & Co. GmbH, Wald-Michelbach, West Germany). The commercial polymer fiber materials mentioned can advantageously be used for the filtration medium of the invention due to their relatively low cost and their inherent properties. For certain filtration purposes, it is contemplated that coated fiber materials are advantageous. Coating may serve various purposes: for example, it may provide a smoothly surfaced fiber, or the coating may endow the fiber with a modified surface energy and/or surface tension (besides modifying the surface structure).

Thus, the fiber material of the filtration medium may be hydrophilic or hydrophobic, depending on the nature of the fluid to be filtered.

It is also contemplated that each fiber of the filtration medium can be provided with a positive (+) or a negative (−) charge. Accordingly, the resulting filtration medium may comprise a plurality of fibers with a positive charge, a plurality of fibers with a negative charge, or a plurality of fibers wherein some of the fibers are provided with a positive charge and other fibers are provided with a negative charge. The positive or negative charge may be provided by means of a coating material or by chemical or physical means.

The filtration medium of the invention comprises a plurality of fibers. It is preferred that the fibers are individual fibers.

In a preferred embodiment of the invention, each fiber of the filtration medium is of substantially uniform cross-sectional area along its entire length. It is preferred that all the fibers of the filtration medium have substantially the same cross-sectional area and/or shape. As will be appreciated, the fluid-flow passages at the location of close packing will ideally have substantially the same cross-sectional shape and/or area in those cases where all the fibers of the filtration medium have substantially the same cross-sectional area and shape.

In another preferred embodiment of the invention, the filtration medium comprises a plurality of fibers of at least two different cross-sectional areas. In this case, the fibers can either have the same cross-sectional shape or may have different cross-sectional shapes. Such a filtration medium will, at the location of close packing, usually have fluid-flow passages of various cross-sectional shapes and/or areas. It is preferred that the fibers of various cross-sectional areas are distributed evenly or uniformly throughout the filtration medium. Accordingly, the fluid-flow passages at the location of close packing, which will be of various cross-sectional areas and/or shapes, will also be distributed evenly or uniformly throughout the resulting filtration medium.

In yet another preferred embodiment of the invention, the filtration medium comprises fibers which are each of a substantially circular cross-section when the fibers are not close packed. If the fibers are made of a material which is resistant to deformation in all directions, or at least in the cross-sectional direction, the fibers will also be of substantially circular cross-section a the location of close packing.

The filtration medium of the invention may comprise fibers which are all made of the same material. However, the filtration medium according to the invention may also comprise fibers made of at least two different materials, such as the materials mentioned above, each fiber preferably being made solely of one type of material. It is to be understood, that a coating material may also be applied to such fibers, thus providing these fibers with other desired surface characteristics.

The present invention is further illustrated by the drawing.

In FIG. 1, a plurality of individual fibers 2 extending in substantially the same general direction is arranged in an opening of circular cross-section defined by the inner surface 3 of a retaining member 2 which is ferrule-shaped. The inner surface 3 is substantially cylindrical and defines the location of close packing of the fibers. A displacement member 5 is inserted substantially in the centre of the bundre of fibers so as to firmly retain the fibers in the ferrule and to secure close packing of the part of the fibers within the ferrule. The displacement member 5 is rod-shaped. The retaining member 4 and the displacement 5 are made from stainless steel. Each of the individual fibers 2 is of substantially the same circular cross-section along its entire length when the fibers are not close packed and is made of nylon 6/12 having a diameter of 4 mils (1 mil=0.001 inch, corresponding to approximately 0.00254 mm) or approximately 0.1 mm.

Figure 2:
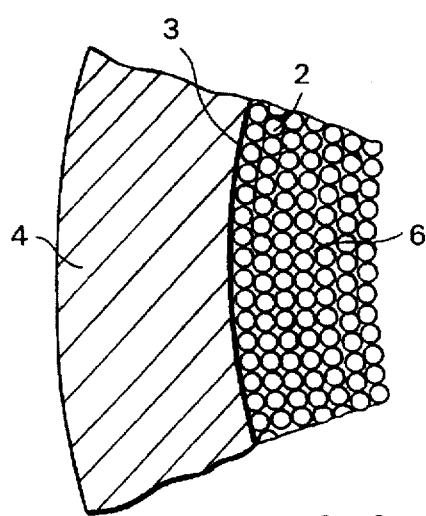
FIG. 2 shows a cross-sectional view of a part of a retaining member of an embodiment Of the invention, a plurality of fibers of circular cross-section being adjacent thereto.

FIG. 2 shows a part of the retaining ferrule 4 with individual fibers 2 arranged adjacent to the inner surface 3 of the ferrule. The individual fibers 2 are close packed although they are not hexagonally close packed and, accordingly, the fluid-flow passages 6, i.e. the interstices between the fibers 2, do not all have substantially the same cross-sectional shape or area.

Figure 3:
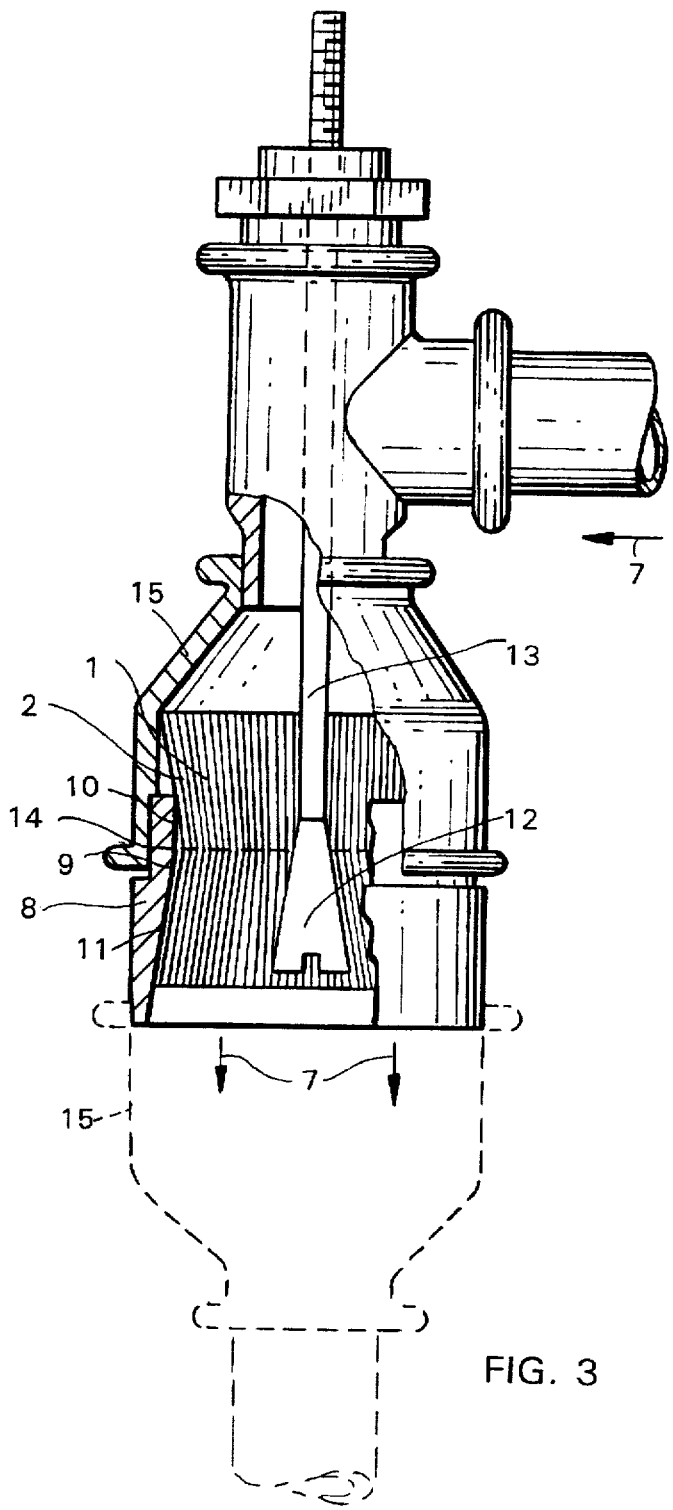
FIG. 3 shows a longitudinal section of an embodiment of a filtration medium according to the invention, the filtration medium being arranged in a retaining member and having a displacement inserted therein.
Figure 4:
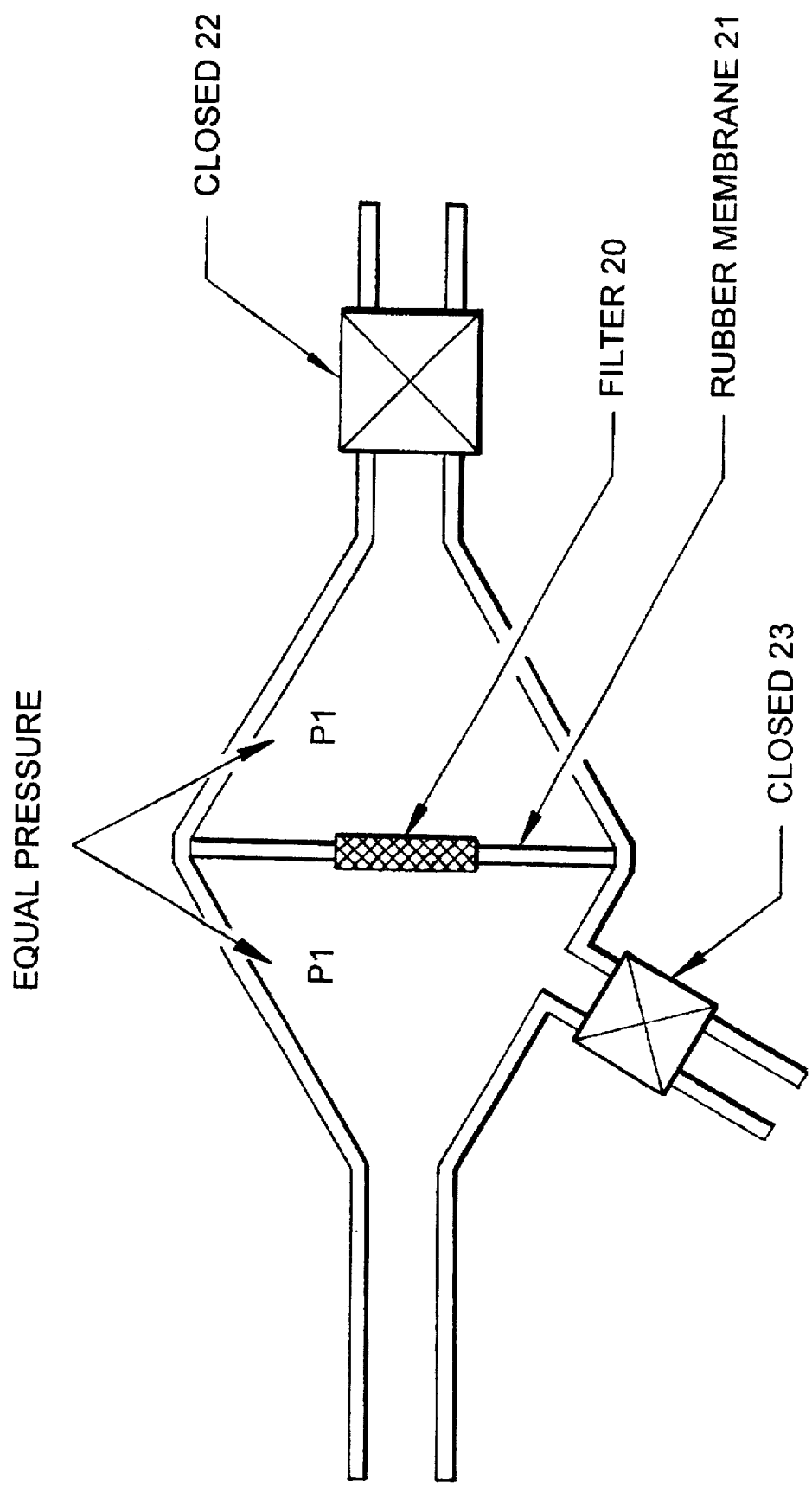
FIG. 4 is a diagrammatic representation of a filter assembly in accordance with the present invention, showing the filter assembly in a static, non-use configuration.

FIG. 3 shows a longitudinal section of the filtration medium of the invention placed in a fitting and intended for use domestically for filtering tap water. The arrows 7 indicate the direction of fluid flow. The plurality 1 of individual fibers 2 are arranged in an opening defined by a retaining ferrule 8 having an inner surface 9, the upper part 10 being substantially cylindrical and the lower part 11 having a conical shape. A displacement member comprising a conical part 12 and a rod-shaped part 13 is arranged substantially in the centre of the plurality of fibers 1. The conical part 12 is arranged in such a way that the pointed end does not extend into the bundle of fibers beyond the retaining ferrule 9. Accordingly, the location of closest packing of the plurality of fibers 1 will be at the cross-section of the bundle of fibers corresponding to 14, where the cross-sectional area provided for the filtration medium is smallest. The retaining ferrule 9, together with the filtration medium and the displacement member, is arranged in appropriate fittings 15.

Another aspect of the invention related to a method for making a flitrating medium for use in filtering a fluid and comprising a plurality of fibers extending in substantially the same general direction, the method comprising arranging a bundle of said fibers in an opening defined in a retaining members; and inserting a displacement member in the bundle of fibers so as to firmly retain the fibers in the member.

The displacement member may also be inserted in the bundle of fibers in order to pack the fibers closely at a location.

The displacement member may also be inserted in the bundle of fibers in order to deform the cross-sectional shape of at least some of the fibers at said location.

In one embodiment of the invention, the retaining member is a ferrule. Preferably, the inner surface of the ferrule defines a constriction, thus defining a cross-section of the opening of the ferrule of smallest area.

The displacing end of the displacement member may have a form selected from those of a rod, a conically pointed rod and a cone. For most purposes, a conically pointed rod is preferred.

The retaining member, for example a ferrule, and the displacement member may be made of any suitable material capable of withstanding the chemical and physical properties of fluid and the particles to be filtered as well as the other conditions, e.g. pressure, temperature, pH, under which the filtration is performed. The displacement member and the retaining member may, for example, be made of a metal, a metal alloy, a polymer or a ceramic material. The displacement member and the retaining member may be made from different materials.

In the practical performance of the method of the invention, a plurality of fibers are arranged so as to extend in substantially the same general direction. A displacement member such as a ferrule having a diameter corresponding to the chosen fiber type(s) and having an inner constriction is chosen as the retaining member. The bundle of fibers is compressed as much as possible by applying a moderate pressure primarily at right angles to the longitudinal direction of the fibers. It should be noted that fibers having relatively small cross-sectional areas are usually not capable of being compressed to the same extent as fibers having relatively larger cross-sectional areas (providing these fibers are made of the same type of material).

It is important that the bundle of fibers is still substantially straight and/or parallel when arranged in the ferrule, i.e. the fibers should not be twisted or coiled and should before compression be essentially parallel to the direction of fluid flow.

A cortically pointed rod is inserted into the bundle of fibers, the point of insertion substantially being the centre of the bundle in the longitudinal direction. Preferably, the rod is inserted from the downstream side with respect to the direction of fluid flow. In this case, the displacement produced by the conically pointed rod is mostly towards the downstream end of the fiber bundle. It is clear that the conically pointed part of the rod must be at least partly encompassed by the displacement member. Also, the tip of the conically pointed part of the rod should not extend into the bundle of fibers beyond the plane of the opening of the retaining displacement member on the side opposite the side of insertion of the rod (cf. also the above explanation of FIG. 3).

The cross-sectional dimension of the displacement member should be chosen in accordance with the dimensions of the fibers of the filtration medium so as to apply to the fibers an appropriate pressure resulting in close packing or even deformation of the fibers. The required dimensions can be calculated by a person skilled in the art when the dimensions of the displacement member such as a ferrule and the fibers as well as the properties of the fibers and the desired total area of fluid-flow passage are given.

Furthermore, it is contemplated that the cross-sectional area and shape of the fluid flow passages of the filtration medium of the invention can be modified, i.e. the area can be reduced, by introducing a liquid which sets or hardens, preferably a setting or hardening liquid providing a spongy or porous structure when set or hardened, to the bundle of fibers upstream of the location of close packing.

An important aspect is that those parts of the fibers which are not close packed and are upstream of the location of close packing are allowed to undergo some minor movement when the fluid to be filtered is flowing through the filtration medium. Accordingly, these parts of the fibers should preferably not be displaced by the displacement member or should be displaced as little as practically possible.

The pressure drop across the filtration medium is an important parameter in the practical use of the filtration medium. It is believed that the pressure drop across the filtration medium of the invention is considerably smaller than for the other filter types mentioned herein. It is contemplated that it is possible to substantially eliminate the pressure drop by providing a filtration medium according to the invention wherein the total cross-sectional area of the fluid-flow passages is the same as the cross-sectional area of the fluid inlet pipe supplying fluid to the filtration medium.

Despite the fact that the filtration medium of the invention can be manufactured from fiber materials of low cost, the filtration medium of the invention can, if desired, also be regenerated by a filter-cleaning process, such as a back-flushing or back-washing process. In such a back-flushing process, the direction of flow is reversed for a suitable period of time. Thus, the retained particles or at least a part thereof will be flushed away from the location of close packing as well as the part of the filtration medium up-stream this location. Such a filter-cleaning process is very useful in connection with the filtration medium according to the invention.

The filtration medium of the invention is of a very general nature. There is no limitation as to the dimensions of the fibers of the filtration medium and, accordingly, the filtration medium can be of an desirable size and provide almost any desirable cross-sectional area of fluid-flow passages.

Thus, the filtration medium of the invention can be used for a wide range of filtration purposes ranging from sterile filtration (ultrafiltration) to coarse filtration.

However, as mentioned hereinbefore, a preferred embodiment of the invention is a filtration medium for retaining particles present in water, especially for the substantial elimination of bacteria, viruses and ochre and, optionally, other undesired solid chemical compounds. It is contemplated that dissolved chlorine or chlorides may also be eliminated from a fluid by some type of ion exchange, if at last some of the fibers or part of some of the fibers is coated with a material having ion-exchanging properties.

It should be understood that various modifications and alterations of the embodiments described above (and shown in the figures) may be envisaged without departing from the scope of the present invention.

While a preferred embodiment (shown in FIGS. 1–3) is suited for filtering drinking water, it should be understood that the filtration medium according to the invention can be used for filtering any kind of liquid and can also be used for filtering air and other gaseous fluids.

The following examples illustrate the invention but should not be considered a limiting the scope thereof.

EXAMPLE 1

A filtration Medium for Filtering Tap Water

The following filtration medium was manufactured:

FIBERS: nylon 6/12

Length: 4 cm

Cross-section: circular

Diameter: 4 mil (approx. 0.1 mm)

RETAINING MEMBER: ferrule made of stainless steel

Length: 2 cm

Outer diameter: 4 cm

Minimum internal diameter: 3.2 cm

Inner surface of the retaining member defining a constriction defining the location of close packing, the constriction being placed at a location which is ⅔ along the total length of the ferrule in the direction of fluid flow.

The angle between the inner surface of the ferrule downstream from the constriction and the outer surface of the ferrule is 30°.

DISPLACEMENT MEMBER: cortically pointed rod made of stainless steel diameter (rod): 3 mm The displacement member being arranged similar to the displacement member of FIG. 3.

The filtration medium is made as described hereinbefore.

When water is flowing through the filtration medium, the pressure contributes to maintaining the fibers in their original position in the ferrule due to the constriction of the inner surface thereof.

EXAMPLE 2

Measurement of Pressure Drop

Two filtration media were manufactured according to Example 1, one of the filtration media (denoted ("B") having 9 mils fibers instead of 4 mils fibers (denoted (A").

The following pressure drops were observed, the inlet pressure being 4 bar:

|  | Pressure drop (bar) |
| --- | --- |
| Filter medium A (4 mils) | 3 bar |
| Filter medium B (9 mils) | 2 bar |

FIGS. 4–7 show a second embodiment for the filtration medium according to the invention.

Figure 5:
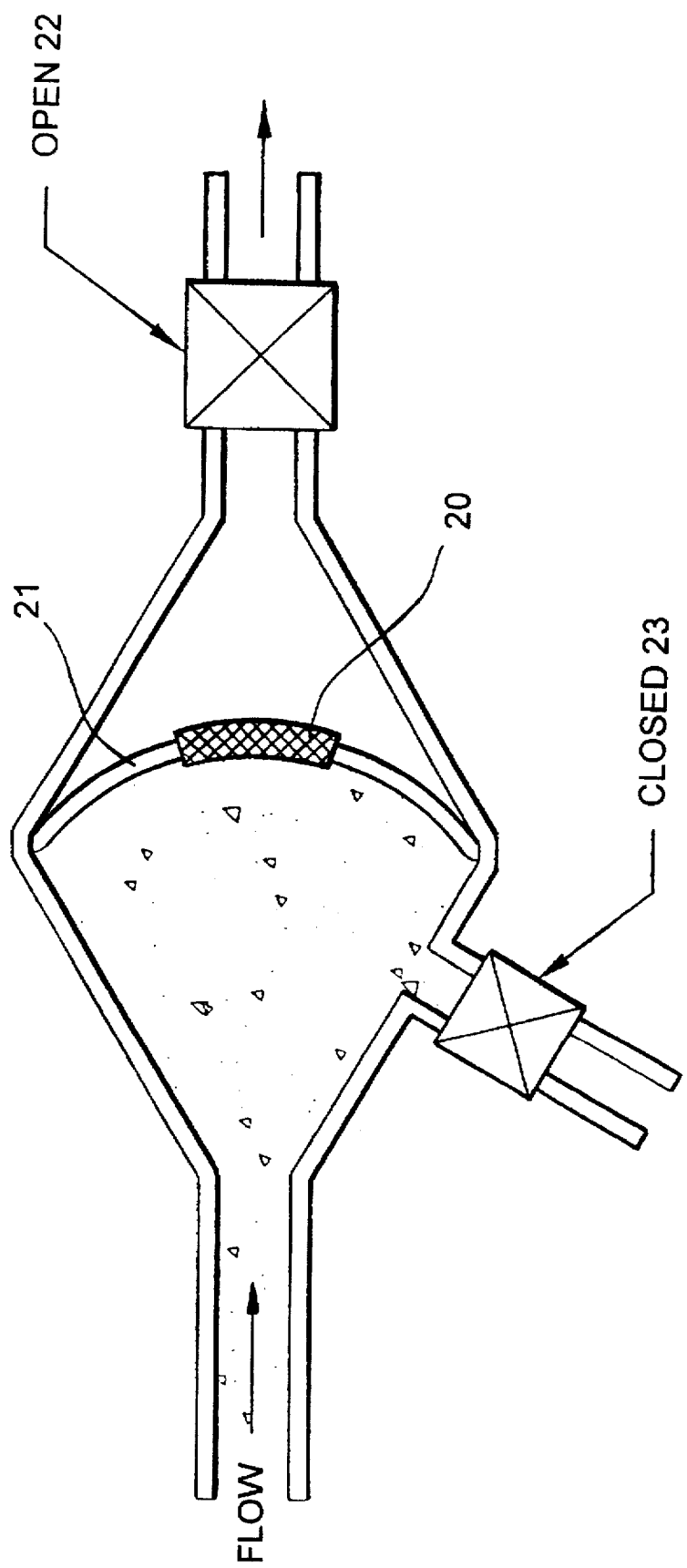
FIG. 5 is a diagrammatic representation similar to FIG. 4, showing the filter assembly of that drawing figure in a forward flow configuration.

The filtration medium 20 consists of a bundle of fibers being attached to an elastic membrane of diaphragm 21 with the filter 20 to move to the right, as shown in FIG. 5, through an open valve 22. Waste is filtered off by the filter 20 which as a consequence sometimes will need cleaning.

Figure 6:
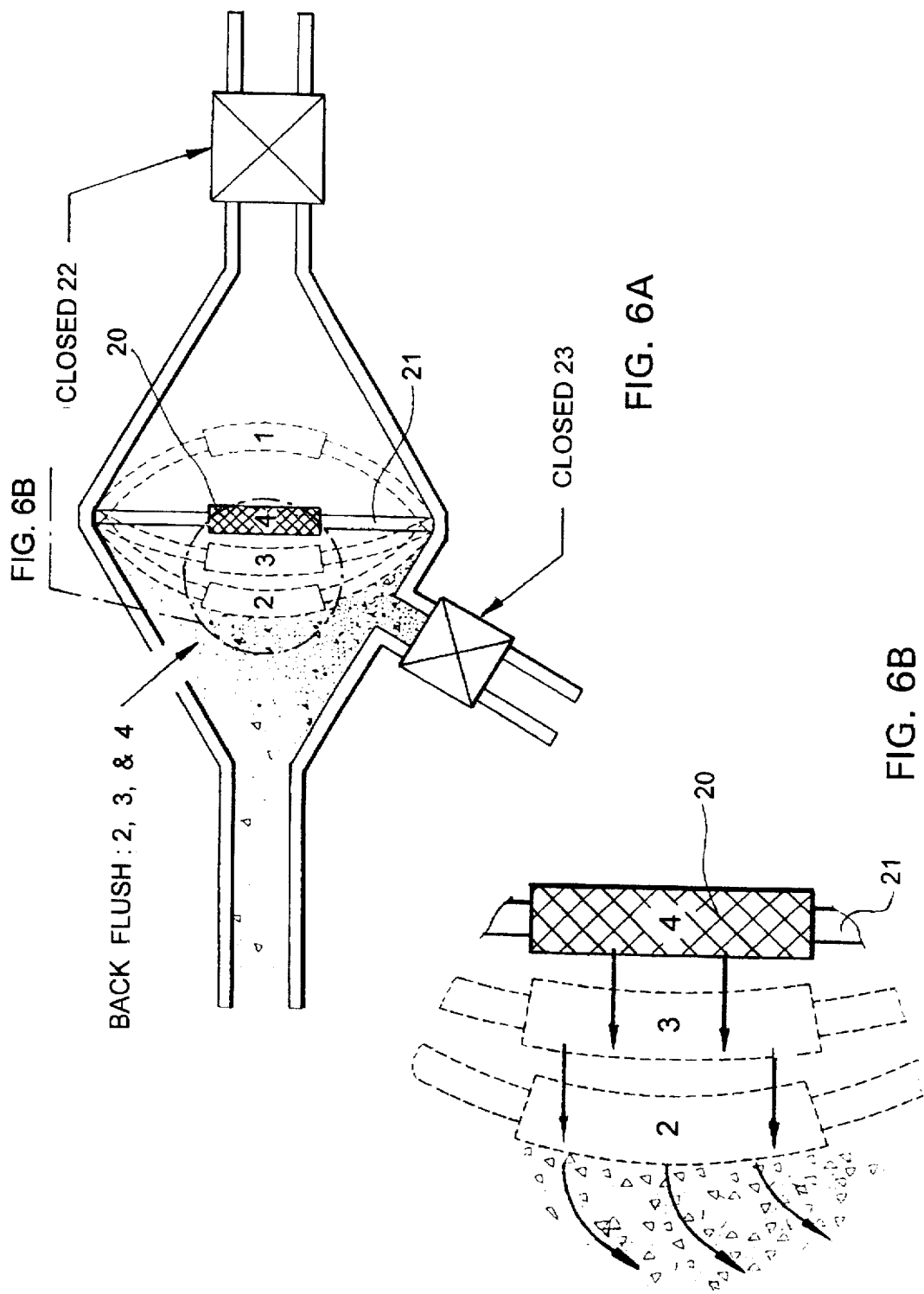
FIG. 6 is a diagrammatic representation similar to FIGS. 4 and 5, indicating the operation of the filter assembly of those drawing figures during a back flush process.

Cleaning is performed, as shown in FIG. 6, by the valve 22 closing. Any flow is thus stopped, and the membrane or diaphragm 21 will move between position 1 and positions 2 and 3. This backflush loosens the waste from the fibers, and the waste is removed so as to accumulate at the bottom of the inlet chamber in the filter housing.

Figure 7:
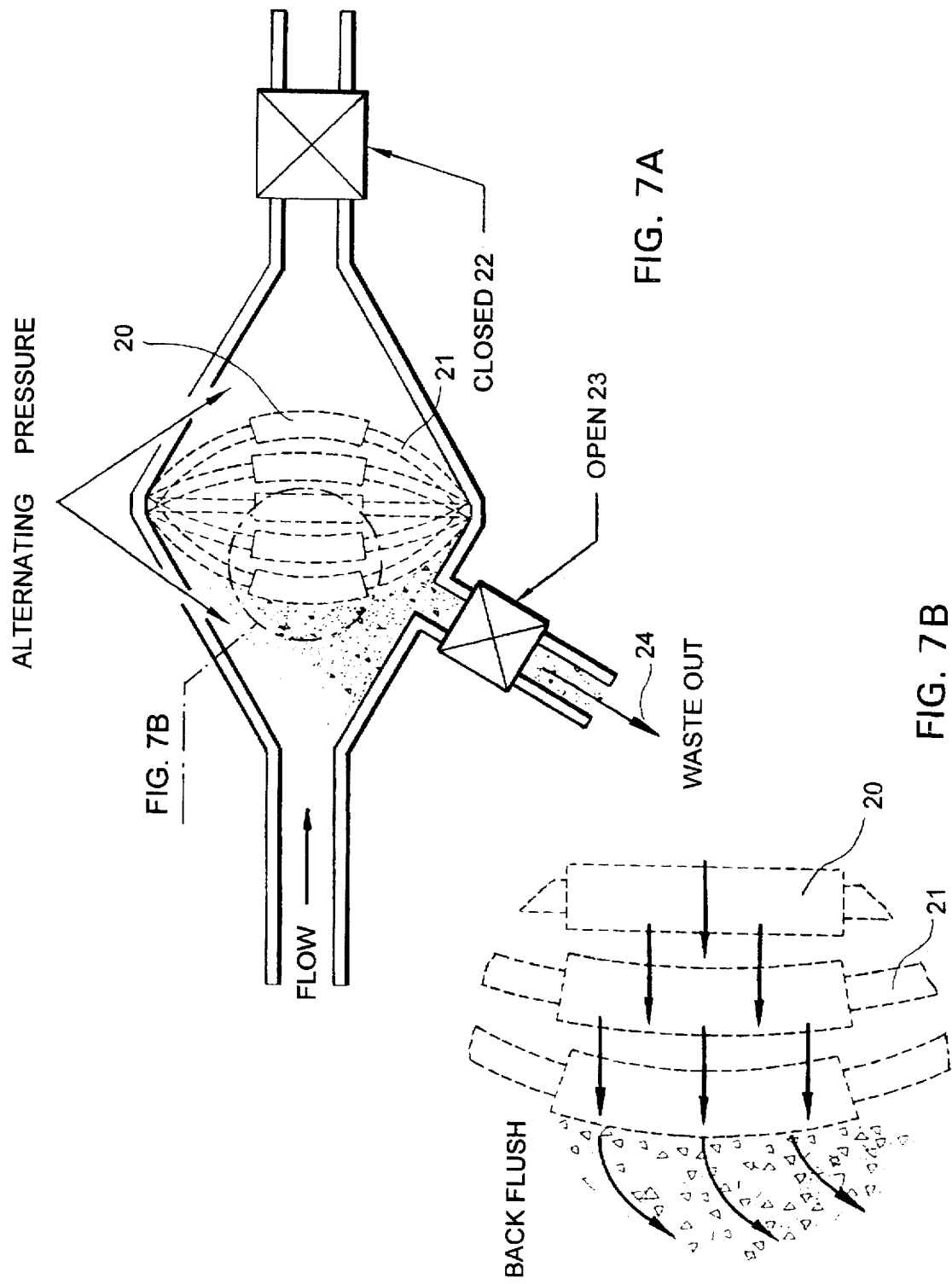
FIG. 7 is a diagrammatic representation similar to FIGS. 4-6, indicating the operation of the filter assembly of those drawing figures during an alternating pressure process.

An outlet valve 23 can then be opened, as shown in FIG. 7, and the waste material 24 can be discharged through this valve 23.

Figure 8:
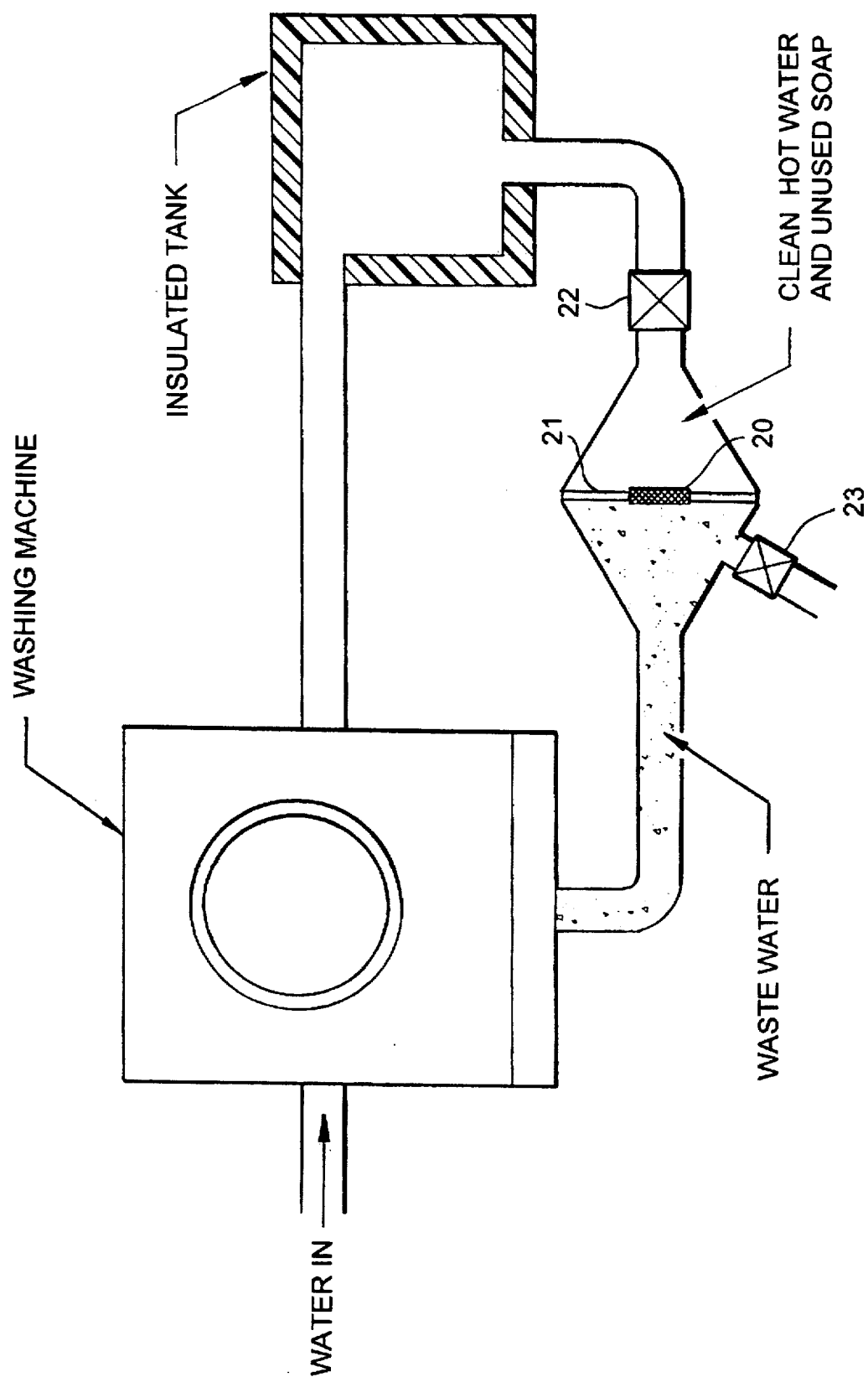
FIG. 8 is a diagrammatic representation of showing the filter assembly of FIGS. 4-7 used in a washing machine facility.

As an example this filtration medium may advantageously be applied for filtering water from washing machines, as shown in FIG. 8.

Hot water may thus be applied again for a new pre-wash, and any remaining soap can be utilized which permits a reduced soap consumption. Moreover, energy consumption is considerably reduced in that the water need not be reheated for the pre-wash.

Figure 9:
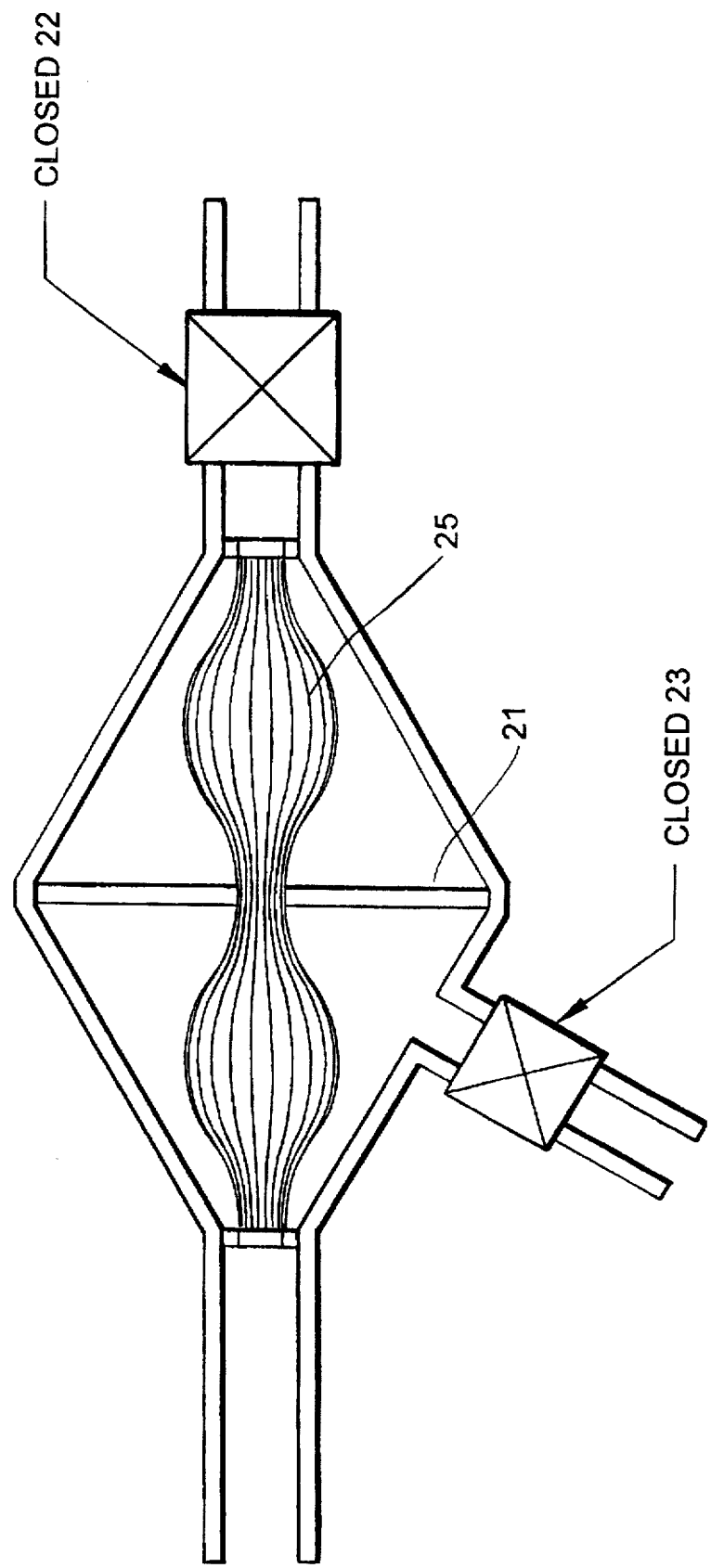
FIG. 9 is a diagrammatic representation of another filter assembly in accordance with the present invention, showing the filter assembly in a static, non-use configuration.
Figure 10:
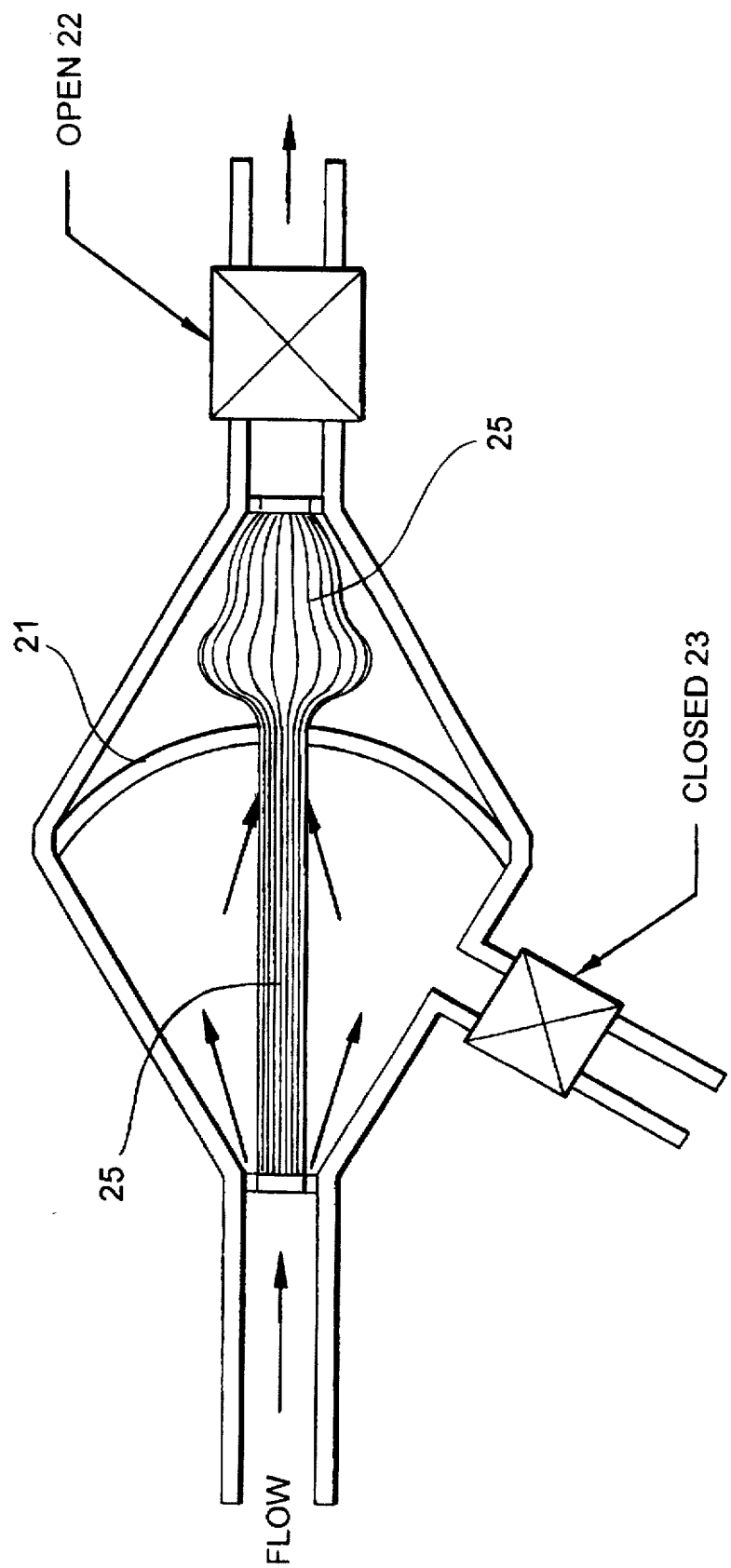
FIG. 10 is a diagrammatic representation similar to FIG. 9, showing the filter assembly of that drawing figure in a forward flow configuration.
Figure 11:
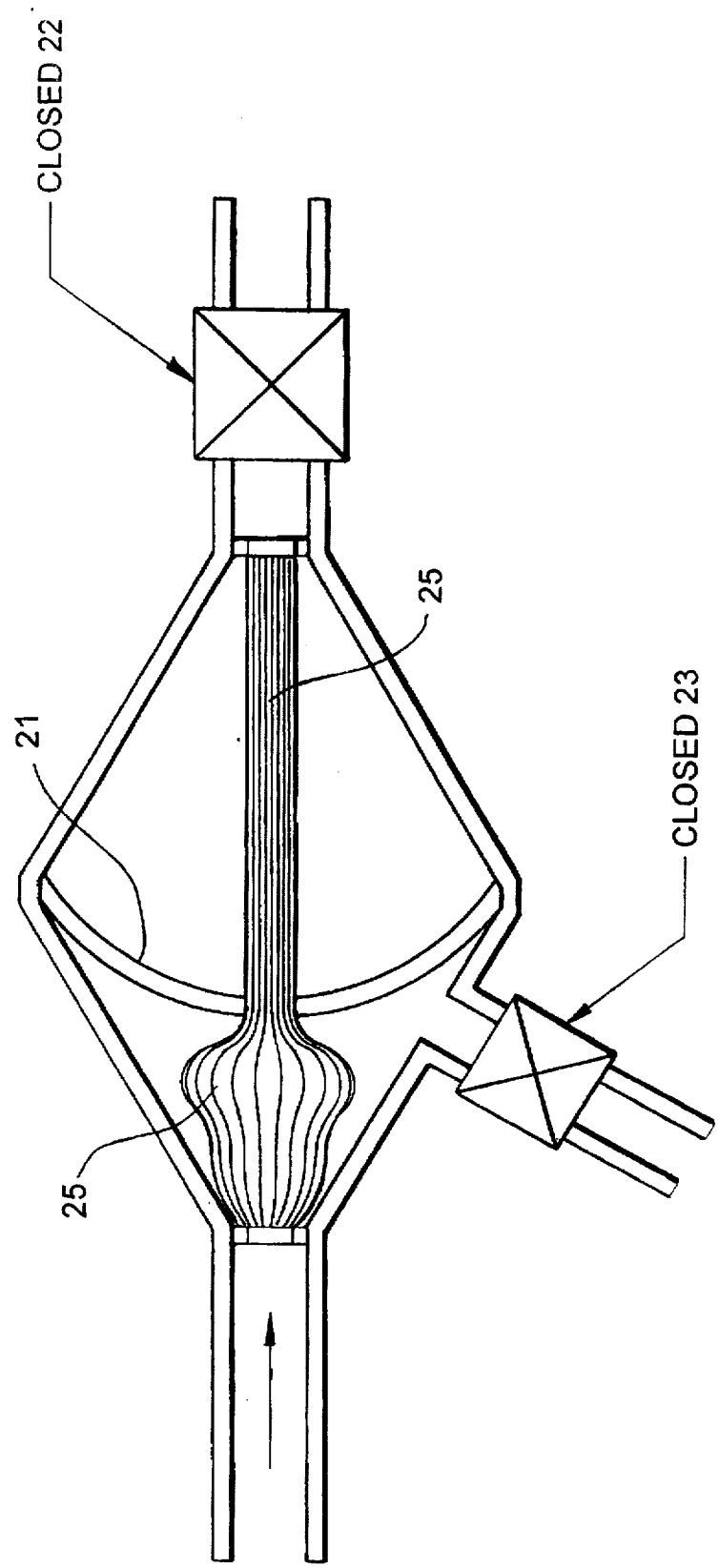
FIG. 11 is a diagrammatic representation similar to FIGS. 9 and 10, indicating the configuration of the filter assembly of those drawing figures during a first phase of a waste removal operation.

FIGS. 9–11 show a further embodiment of a filter according to the invention.

A bundle of fibers is arranged in a filter housing in such a manner that the ends of the bundle 25 are secured so as for the fiber bundle to extend between the inlet and the outlet of the housing.

At the ends a passage round the fiber bundle 25 is provided, as shown in FIG. 10.

At the centre the fiber bundle 25 is secured to a rubber membrane of diaphragm 21.

Figure 12:
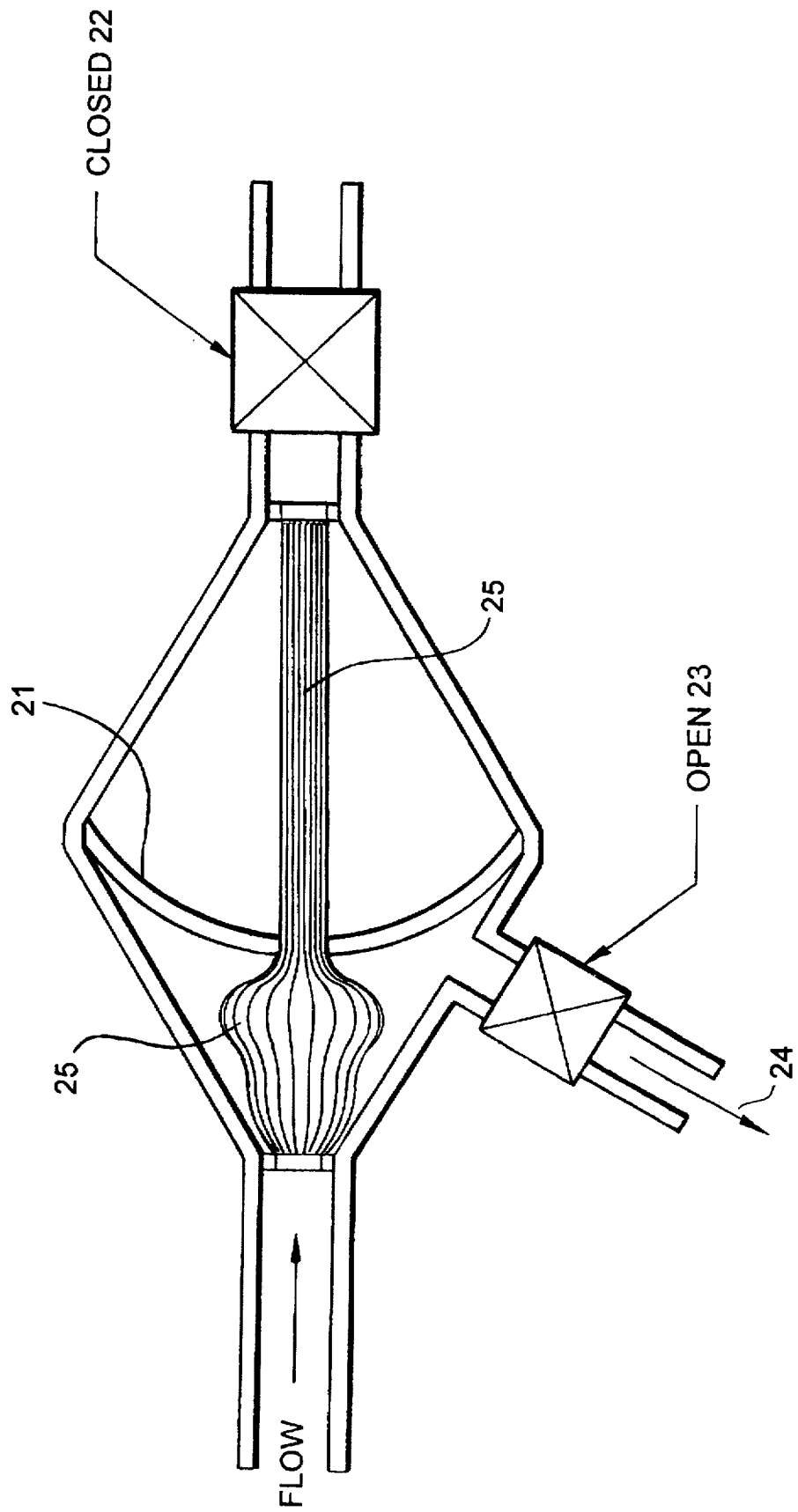
FIG. 12 is a diagrammatic representation similar to FIGS. 9-11, indicating the configuration of the filter assembly of those drawing figures during a second phase of a waste removal operation.

The fiber bundle 25 can thus be moved to and from in the filter housing, and the fibers can be flushed in a very efficient manner. The bundle of fibers 25 will open when pressed together, as shown in FIG. 11, whereby all waste is removed effectively. The waste 24 can be removed through a valve 23 as shown in FIG. 12.

What is claimed is:

1. A filtration medium for use in filtering a fluid comprising:

a plurality of solid fibers all extending in alignment for at least a predetermined distance in substantially the same general direction;

a retaining element disposed at the outer side of the plurality of aligned fibers;

a displacement member inserted inside the plurality of aligned fibers, for pressing essentially all the aligned fibers into a close packed configuration along a portion thereof adjacent the retaining member and displacement member; and a plurality of fluid-flow passages defined between the closed packed fibers, each of the fluid flow passages having a cross-sectional area sufficiently small to retain particles to be filtered from the fluid passing therethrough, each of the fibers having a ratio of length to maximum cross sectional dimension of at least 10.

2. The filtration medium according to claim 1 wherein the plurality of fibers are each individual fibers.

3. The filtration medium according to claim 1 wherein each of the fibers has a smooth surface.

4. The filtration medium according to claim 1 wherein each of the fibers is of substantially uniform cross-sectional area along its entire length.

5. The filtration medium according to claim 1 wherein each of the fibers has a ratio of length to maximum cross-sectional dimension of at least 100.

6. The filtration medium according to claim 1 wherein each of the fibers has a ratio of length to maximum cross-sectional dimension of at least 1000.

7. The filtration medium according to claim 1 wherein all of the fibers have substantially the same cross-sectional area.

8. The filtration medium according to claim 1 wherein the fluid-flow passages have substantially the same cross-sectional shape.

9. The filtration medium according to claim 1, wherein the plurality of fibers include fibers having at least two different cross-sectional areas.

10. The filtration medium according to claim 9 wherein the fibers of each of the different cross-sectional areas are uniformly distributed among the plurality of fibers.

11. The filtration medium according to claim 1 wherein the retaining and displacement elements are disposed about a middle portion of the plurality of fibers.

12. The filtration medium according to claim 1 wherein each of the fibers is of substantially circular cross-sectional area at points longitudinally spaced from the close packed portion.

13. The filtration medium according to claim 1 wherein the fibers have a maximum diameter of 5 mm.

14. The filtration medium according to claim 1 wherein the fibers have a maximum diameter of 2 mm.

15. The filtration medium according to claim 1 wherein the fibers have a maximum diameter of 0.5 mm.

16. The filtration medium according to claim 1 wherein the plurality of fibers are all made of the same material.

17. The filtration medium according to claim 1 wherein the plurality of fibers contain some fibers made of one material and other fibers made of a different material.

18. The filtration medium according to claim 1 wherein each of the fibers is made of a material selected from the group consisting of glass, metals, ceramics, natural and synthetic polymers.

19. The filtration medium according to claim 1 wherein the plurality of fibers are made of a material which is slightly deformable under the application of moderate pressure.

20. The filtration medium according to claim 1 wherein the plurality of fibers are made of glass.

21. The filtration medium according to claim 1 wherein each of the fibers is made of a polymer selected from the group consisting of polyamides, polyesters, polyethylene, polypropylene, polycaprolactam, natural rubber, synthetic rubber, silicones or siloxane polymers.

22. The filtration medium according to claim 1 wherein the plurality of fibers are made of a material containing keratin.

23. The filtration medium according to claim 1 wherein the plurality of fibers are each selected from the group consisting of hair fibers and silk fibers.

24. The filtration medium according to claim 1 wherein the plurality of fibers are each provided with an electrical charge.

25. The filtration medium according to claim 1 wherein the plurality of fibers are loosely packed in at least one portion longitudinally spaced from the close packed portion so that the loosely packed fiber portions are capable of transverse displacement when fluid is flowing through the filtration medium.

26. A method for making a filtration medium for use in filtering a fluid, comprising:

provided a plurality of solid fibers, a retaining member having an opening, and a displacement member;

arranging the fibers so that the fibers extend in alignment for at least a predetermined distance in substantially the same general direction to form a fiber bundle;

placing the fiber bundle in the opening; and inserting the displacement member into the bundle of fibers so as to compress essentially all of the fibers between the displacement member and the retaining member, forming a close packed configuration along the portion thereof, fluid-flow passages formed between the close packed fibers, each of the fluid flow passages having a cross-sectional area sufficiently small to retain particles to be filtered from the fluid passing therethrough, each of the fibers having a ratio of length to maximum cross sectional dimension of at least 10.

27. The method according to claim 26 wherein the displacement member is inserted into the bundle of fibers so as to deform cross-sectional shapes of at least some of the close packed fibers.

28. The method according to claim 26 wherein the retaining member is a ferrule having an inner surface formed with a constriction.

* * * * *